United States Patent Office 3,118,899
Patented Jan. 21, 1964

3,118,899
PROCESS OF PREPARING PYRIDYL ALKYL KETONES
Francis E. Cislak, Indianapolis, Ind., assignor to Reilly Tar & Chemical Corporation, Indianapolis, Ind., a corporation of Indiana
No Drawing. Filed Mar. 18, 1960, Ser. No. 15,805
6 Claims. (Cl. 260—297)

My invention relates to a process of producing pyridyl alkyl ketones. More specifically, it relates to a process of producing pyridyl alkyl ketones by the vapor phase oxidation of alkyl pyridines.

It is known that certain substituted pyridine bases in which the substituent and the pyridine nucleus are linked through a carbon-carbon bond may be oxidized in the vapor phase with air to form partial oxidation products, such as pyridine carboxylic acids or cyanopyridines (Cislak and Wheeler, U.S.P. 2,437,938).

I have now found it possible to oxidize such substituted pyridine bases in the vapor phase to form pyridyl alkyl ketones, by catalytic partial oxidation with a mild oxidizing oxygen-containing gas, such for instance as air, mixed with an aliphatic carboxylic acid.

In carrying out my invention I prepare a mixture of an alkylpyridine and an aliphatic carboxylic acid. The so prepared mixture is vaporized, mixed with air, and the resultant mixture is passed through a suitable reactor containing a catalyst. The temperature of the reactor is maintained between about 250° C. and 600° C. and preferably between about 350° C. and 425° C. I prefer to conduct my process in a continuous manner, although that is not necessary. I may add steam to my reaction mixture if desired to moderate the oxidation.

The reactor used may be of various types. I prefer the fluid catalyst type, similar to those normally used in carrying out cracking operations in the petroleum industry. Such reactors are of tubular form with suitable connections at entrance and exit. They are provided with means for supporting the fluid bed of catalyst, and are provided with any convenient means for heating them.

The catalyst used may be any of a large number of oxidation catalysts which are useful for the vapor phase partial oxidation of benzene, naphthalene, and anthracene to maleic anhydride, phthalic anhydride, and anthraquinone respectively.

Illustrative of the manner in which my invention may be carried out are the following examples. The parts are by weight.

EXAMPLE 1

*4-Acetylpyridine*

To 100 parts of 4-picoline, I add 150 parts of acetic acid. The resulting solution is vaporized, mixed with about 3,000 parts of air to prepare a gaseous mixture of 4-picoline, acetic acid, and air. I pass the mixture of vapors through a fluid catalyst type reactor containing a fluidized catalytic bed of a vanadium alumina catalyst (10% $V_2O_5$ on alumina). The temperature of the reactor is maintained at about 400° C. As the mixture of 4-picoline, acetic acid, and air passes through the reactor, a reaction occurs whereby 4-acetylpyridine is formed. The vapors of the unchanged reactants and the reaction products are condensed as they emerge from the reactor, and the condensate is collected in a suitable receiver. The condensate is fractionated to recover the 4-acetylpyridine. To avoid decomposition of the 4-acetylpyridine, the fractional distillation is preferably carried out under vacuum.

In place of the vanadium-alumina catalyst, I may use a number of other catalysts. Among the catalysts I have found useful in carrying out my reaction are oxidation catalysts of the type which are useful for the vapor phase partial oxidation of benzene to maleic anhydride, of naphthalene to phthalic anhydride, and of anthracene to anthraquinone. Such catalysts include in addition to the vanadium alumina catalyst of Example 1, thorium, manganese, chromium, cobalt, molybdenum, etc.; mixtures of these catalysts may also be employed.

EXAMPLE 2

*4-Propionylpyridine*

The procedure of Example 1 is repeated with the exception that I use about 180 parts of propionic acid in place of the 150 parts of acetic acid, and I recover 4-propionylpyridine.

EXAMPLE 3

*3-Acetylpyridine*

The procedure of Example 1 is repeated with the exception that I use 3-picoline in place of the 4-picoline, and I recover 3-acetylpyridine.

EXAMPLE 4

*2-Acetylpyridine*

The procedure of Example 1 is repeated with the exception that I use 2-picoline in place of the 4-picoline, and I recover 2-acetylpyridine.

EXAMPLE 5

*2,5-Diacetylpyridine*

The procedure of Example 1 is repeated with the exception that I use 75 parts of 2-methyl-5-ethylpyridine in place of the 4-picoline, and I recover 2,5-diacetylpyridine.

I claim as my invention.

1. The process of preparing pyridyl alkyl ketones which comprises passing gas-vapor mixture comprising alkyl pyridine, aliphatic carboxylic acid selected from the group consisting of acetic and propionic acids, and oxygen-containing gas through a reactor containing a vanadium catalyst, maintained at a temperature between about 350° C. and 425° C.

2. The process of preparing pyridyl alkyl ketones which comprises passing gas-vapor mixture comprising picoline, acetic acid, and air through a reactor containing a vanadium oxide catalyst maintained at a temperature between about 350° C. and 425° C.

3. The process of claim 2 in which the picoline used is 3-picoline.

4. The process of claim 2 in which the picoline used is 4-picoline.

5. The process of claim 2 in which the picoline used is 2-picoline.

6. The process of claim 2 in which the picoline used is 2-methyl-5-ethylpyridine.

References Cited in the file of this patent

UNITED STATES PATENTS

| | | |
|---|---|---|
| 2,437,938 | Cislak et al. | Mar. 16, 1948 |
| 2,479,067 | Gresham | Aug. 10, 1949 |
| 2,510,605 | Porter et al. | June 6, 1950 |
| 2,670,352 | Fand et al. | Feb. 23, 1954 |
| 2,749,350 | Nowlin | June 5, 1956 |
| 2,749,351 | Mathes et al. | June 5, 1956 |
| 2,833,778 | Saffer et al. | May 6, 1958 |

OTHER REFERENCES

Sabatier et al.: Compt. rend. (Fr. Acad.), vol. 152, pages 360, 699 (1911).

Herbst et al.: "Org. Syntheses," Coll. vol. II, pages 389–91, (1943).

Webb et al.: J. Am. Chem. Soc., vol. 71, pages 2285–86 (1949).